Sept. 26, 1950     D. M. POTTER     2,523,997

NUTCRACKER

Filed March 25, 1946

INVENTOR
DAVID M. POTTER.
BY
ATTORNEY

Patented Sept. 26, 1950

2,523,997

UNITED STATES PATENT OFFICE 2,523,997

NUTCRACKER

David M. Potter, Plainfield, N. J.

Application March 25, 1946, Serial No. 656,918

2 Claims. (Cl. 146—14)

My invention relates to nut crackers.

Usually nut crackers comprise two levers pivotally connected together at one end and adapted to receive, between their connecting point and their free ends, the nuts to be cracked. Such nut crackers, although capable of cracking comparatively soft-shell nuts, such as English walnuts, pecans, etc., are completely unsatisfactory if hard-shell nuts, such as black walnuts, Brazil nuts, filberts, etc., are required to be cracked. Particularly is this true where the mentioned type nut crackers are used by women or children. Such nut crackers, to say the least, are completely lacking in that degree of mechanical advantage which a good all-around nut cracker should possess.

One object of the present invention is to so design and construct a nut cracker as to obtain a mechanical advantage greater than heretofore achieved.

A further object of the invention is to provide a simple, inexpensive and lightweight nut cracker which a child can operate, and without undue exertion crack the hardest of hard-shell edible nuts.

Briefly stated, my improved nut cracker may be said to comprise an open top receptacle, an upstanding mounting pin fastened to the bottom wall of said receptacle toward one side of the center thereof, and an eccentrically mounted nut cracker member rotatable about the axis of said pin. In the drawings, wherein like reference characters denote like or corresponding parts throughout the several views.

Figure 1:
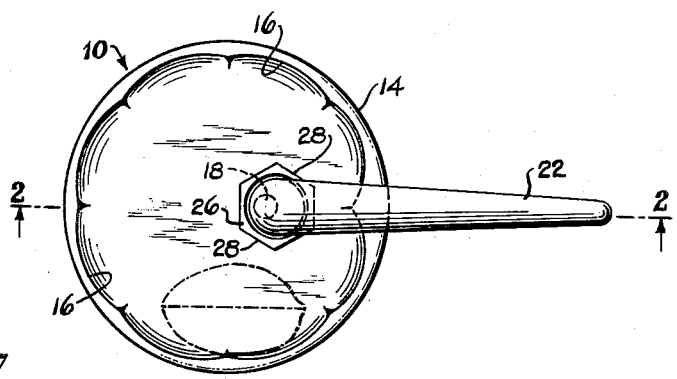
Figure 1 is a plan view of the nut cracker.
Figure 2:
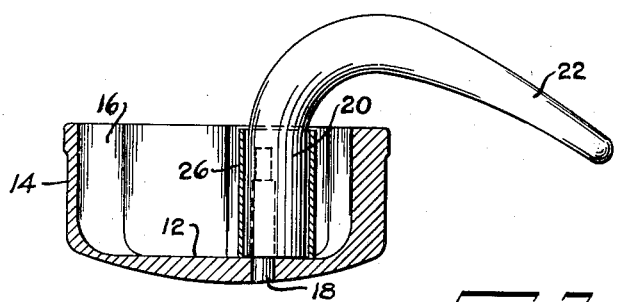
Figure 2 is a transverse vertical section on the line 2—2 of Figure 1.
Figure 3:
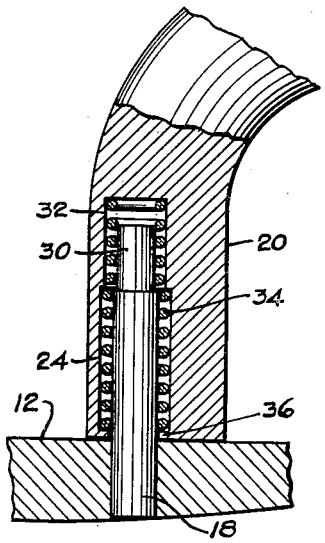
Figure 3 is an enlarged transverse vertical section of the nut-cracking member showing in detail the manner in which it is fastened to the mounting pin.

In the embodiment of the invention selected for illustration a substantially cup-shaped nut receptacle 10, having a bottom wall 12 and a generally circular side wall 14 is shown. On the inside, the side wall 14 is fluted as indicated at 16, and such fluted portion throughout a portion of its circumference is adapted to function as an anvil.

Within the receptacle, and securely fastened to the bottom wall 12 thereof, I provide an upstanding mounting pin 18 which, it will be noted, is disposed off center, i. e., closer to the fluted anvil portion of the side wall 14 than to the portion of the side wall diametrically opposite thereto. The reason for such offset will be hereinafter more fully explained. Preferably the mounting pin 18 is coextensive in length with the overall depth of the receptacle 10.

The nut-cracking member or hammer 20 of the nut cracker, and the handle 22 by which the member 20 is turned, may be separately formed or, as shown, formed in one piece. On assembly, the inner end of the member 20 bears solidly on the bottom wall 12 of the receptacle, and the mounting pin 18, about the axis of which the member 20 is adapted to turn, engages in an offset bore 24 formed in said member. The length of the handle 22, which in the embodiment shown is sufficient to extend well beyond the side wall 14 of the receptacle, coupled with the measure of distance between the center of the bore 24 and the axis of the member 20, determines the degree of mechanical advantage which it is possible to obtain. Suffice it to state that in the assembly illustrated the mechanical advantage obtained is adequate to crack the shell of the hardest of hard-shell edible nuts. In all essential respects, the movement and operation of the member 20 may be compared with that of a conventional cam or eccentric.

While by no means mandatory, it has been found on test that better results can be obtained in cracking nuts if the member 20 is equipped with a freely turnable sleeve or the like such as that indicated at 26. This sleeve, it will be noted, fits loosely around the shank of the member 20, is provided with vertically extending ridges or flutes 28, and is free to rotate both with and with respect to the member 20 as the latter is turned by means of the handle 22. By fluting both the exterior wall of the sleeve 26 and the interior wall of the anvil, an effective means is provided tending to prevent backward slippage of nuts in their movement toward and into final cracking position. Less satisfactory, though effective, results can be obtained, however, even if the sleeve 26 is omitted. If omitted, the exterior surface of the member 20 itself should be fluted since it is more or less essential that at least one of the surfaces i. e. either the outer surface of the nutcracking member or the inner surface of the side wall anvil portion be made irregular so as to grip and hold the nut against slippage as one said surface is rotated relative to the other.

In my further experiments with the nut cracker I discovered that it was desirable, if not essential, that some means be provided to releasably, though firmly, hold the member 20 in operative relation to the pin 18 about the axis of which it is adapted to turn. This problem I solved in a rather novel way. The pin 18, be it observed, is provided at its outer end with an extension 30, slightly smaller in diameter than is the diameter of the remaining portion of its length. It will also be observed that the bore 24 is similarly characterized, i. e., throughout its inner end portion 32 it is slightly smaller in diameter than is the diameter of the remaining portion of its length. The purpose of this diametral difference is two-fold. Within the bore a small attenuated coil spring 34 is fitted. At its lower end the spring 34 bears against a flange 36 formed at the corresponding end of the bore, whereas at its opposite end it extends well into the small diameter portion thereof. To hold the spring in place, once it is extended into the small diameter portion of the bore, all that is necessary is to see to it that its external diameter is slightly greater than the internal diameter of the bore portion 32 and that its internal diameter is slightly less than the diameter of the larger portion of the mounting pin 18. If so dimentioned, the expanding tendency of the spring (plus its contact with the flange 36) will tend to resist its withdrawal from the bore portion 32, whereas its contracting tendency will similarly tend to resist withdrawal of the member 20—the resistance in each instance being frictional only, though insufficient in any case to prevent forceable removal of the pin 18 if and when removal for any reason is required. In the absence of some such, or an equivalent means, there is always the likelihood that the member 20 together with the handle 22 will accidently work loose, fall off and become lost.

A nut cracker of the type disclosed is light in weight, inexpensive to manufacture, and easy to operate. To crack a nut it is only necessary to first place the nut in the receptacle 10 in the position shown in Figure 1. When so placed or positioned, the mere turn of the handle 22 in a clockwise direction will cause the nut to move and wedge itself between the cracking member 20 and the anvil portion of the side receptacle wall. The flutes on the sleeve 26 and on the anvil portion 14 tend to prevent backward slippage of the nut at all times. Once so positioned, a slight continued movement of the handle in the same direction will cause the shell of the nut to be crushed or cracked—the receptacle containing within its confines the meat of the nut as well as the cracked and broken pieces of the shell.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a nut cracker; an open top substantially cup-shaped receptacle having a closed bottom wall and an up-standing side wall portion adapted throughout a portion of its extent to function as an anvil, said receptacle being adapted to receive within its confines, until removed therefrom through said open top, the nut to be cracked and also the cracked shell and nut-meat subsequent to cracking; and a rotatable nut-cracking member anchored to and rising from the bottom wall of said receptacle toward said open top adapted, in a nut-cracking operation, to cooperate with said side wall anvil portion; at least one of the surfaces of the nut cracking member and the side wall anvil portion being irregularly surfaced so as to grip and hold the nut against slippage; said rotatable nut cracking member having an axis of rotation eccentric to its geometric center.

2. In a nut cracker; an open top substantially cup-shaped receptacle having a closed bottom wall and an up-standing side wall portion adapted throughout a portion of its extent to function as an anvil, said receptacle being adapted to receive within its confines, until removed therefrom through said open top, the nut to be cracked and also the cracked shell and nut-meat subsequent to cracking; and a rotatable nut-cracking member anchored to and rising from the bottom wall of said receptacle toward said open top adapted, in a nut-cracking operation, to cooperate with said side wall anvil portion; at least one of the surfaces of the nut cracking member and the side wall anvil portion being irregularly surfaced so as to grip and hold the nut against slippage; said rotatable nut cracking member having an axis of rotation eccentric to its geometric center as well as eccentric to the geometric center of the bottom wall of said receptacle.

DAVID M. POTTER.

REFERENCES CITED

The following references are of record in the file of this patent:

UNITED STATES PATENTS

| Number | Name | Date |
|---|---|---|
| 131,944 | Negri | Oct. 8, 1872 |
| 340,271 | Abele | Apr. 20, 1886 |
| 839,260 | Benson | Dec. 25, 1906 |
| 982,829 | Kemish | Jan. 31, 1911 |
| 1,107,288 | Gillam | Aug. 18, 1914 |
| 1,274,803 | Spitz | Aug. 6, 1918 |
| 1,622,990 | Bonsieur | Mar. 29, 1927 |
| 2,226,272 | Wadsworth | Dec. 24, 1940 |
| 2,301,169 | Engstrom | Nov. 3, 1942 |
| 2,321,795 | Buckman | June 15, 1943 |

FOREIGN PATENTS

| Number | Country | Date |
|---|---|---|
| 147,009 | Great Britain | Apr. 14, 1921 |